United States Patent
Venkatachalam

(10) Patent No.: US 8,126,466 B2
(45) Date of Patent: *Feb. 28, 2012

(54) SYSTEM AND METHOD FOR RELOCATING A FOREIGN AGENT FOR AN IDLE MODE MOBILE STATION IN A PROXY MOBILE INTERNET PROTOCOL ENABLED ACCESS SERVICE NETWORK

(75) Inventor: Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 12/615,378

(22) Filed: Nov. 10, 2009

(65) Prior Publication Data

US 2010/0056154 A1    Mar. 4, 2010

Related U.S. Application Data

(63) Continuation of application No. 11/419,455, filed on May 19, 2006, now Pat. No. 7,633,904.

(51) Int. Cl.
*H04W 36/00* (2009.01)
(52) U.S. Cl. ........ 455/436; 455/458; 455/518; 455/574; 455/428; 455/433; 370/331; 370/338; 370/260; 370/252; 370/254
(58) Field of Classification Search .............. 455/428, 455/436, 458, 518, 574; 370/331, 252, 338, 370/260, 254
See application file for complete search history.

(56) References Cited

U.S. PATENT DOCUMENTS

| | | | |
|---|---|---|---|
| 6,438,370 B1 | 8/2002 | Einola et al. | |
| 6,647,261 B1 | 11/2003 | Banerjee | |
| 7,170,863 B1 | 1/2007 | Denman et al. | |
| 7,561,692 B2 * | 7/2009 | Altshuller et al. | 380/247 |
| 2004/0067754 A1 | 4/2004 | Gao et al. | |
| 2006/0099972 A1 * | 5/2006 | Nair et al. | 455/458 |
| 2007/0105567 A1 * | 5/2007 | Mohanty et al. | 455/458 |
| 2007/0105600 A1 * | 5/2007 | Mohanty et al. | 455/574 |
| 2007/0165858 A1 | 7/2007 | Bakshi | |
| 2007/0191031 A1 * | 8/2007 | Mohanty et al. | 455/458 |
| 2007/0201697 A1 * | 8/2007 | Altshuller et al. | 380/247 |

(Continued)

FOREIGN PATENT DOCUMENTS

KR            578653          5/2006

(Continued)

OTHER PUBLICATIONS

"U.S. Appl. No. 11/419,455 Response filed Mar. 3, 2009 to Non-Final Office Action mailed Nov. 24, 2008", 13 pgs.

(Continued)

*Primary Examiner* — Charles Appiah
*Assistant Examiner* — Michael Vu
(74) *Attorney, Agent, or Firm* — Schwegman, Lundberg & Woessner, P.A.; Gregory J. Gorrie

(57) ABSTRACT

Embodiments of a wireless access network and methods for relocating a foreign agent (FA) for an idle mode mobile station (MS) in a proxy mobile internet protocol (PMIP) enabled access service network (ASN) are described herein. In some embodiments, the relocation of the FA is triggered by either an anchor paging controller or a paging controller of a target ASN when the idle mode mobile stations moves across ASNs.

13 Claims, 2 Drawing Sheets

IDLE MODE HANDOVER PROCEDURE

U.S. PATENT DOCUMENTS

| | | | |
|---|---|---|---|
| 2007/0202871 A1* | 8/2007 | Altshuller et al. | 455/428 |
| 2007/0206557 A1 | 9/2007 | Iyer et al. | |
| 2007/0254677 A1 | 11/2007 | Venkitaraman et al. | |

FOREIGN PATENT DOCUMENTS

| | | |
|---|---|---|
| WO | WO-2007137069 A1 | 11/2007 |

OTHER PUBLICATIONS

"U.S. Appl. No. 11/419,455 Non-Final Office Action mailed Nov. 24, 2008", 3 pgs.

"U.S. Appl. No. 11/419,455, Final Office Action mailed May 8, 2009", 3 pgs.

"U.S. Appl. No. 11/419,455, Notice of Allowance mailed Aug. 5, 2009", 10 pgs.

"U.S. Appl. No. 11/419,455, Response filed Jun. 25, 2009 to Final Office Action mailed May 8, 2009", 13 pgs.

"PCT Application No. PCT/US2007/069038 International Search Report mailed Oct. 25, 2007", 3 pgs.

"PCT Application No. PCT/US2007/069038 Written Opinion mailed Oct. 25, 2007", 5 pgs.

\* cited by examiner

IDLE MODE HANDOVER PROCEDURE

SYSTEM AND METHOD FOR RELOCATING A FOREIGN AGENT FOR AN IDLE MODE MOBILE STATION IN A PROXY MOBILE INTERNET PROTOCOL ENABLED ACCESS SERVICE NETWORK

CROSS-REFERENCE TO RELATED APPLICATIONS

This application is a continuation of U.S. patent application Ser. No. 11/419,455, filed on May 19, 2006, now issued as U.S. Pat. No. 7,633,904, which is incorporated herein by reference in its entirety.

TECHNICAL FIELD

Some embodiments of the present invention pertain to wireless access networks. Some embodiments pertain to relocating a foreign agent (FA) for an idle mode mobile station (MS) in a proxy mobile internet protocol (PMIP) enabled access service network (ASN). Some embodiments pertain to PMIP operations of idle mode mobile stations in accordance with one of the IEEE 802.16 standards.

BACKGROUND

Wireless access networks can be used to communication voice data, such as voice over internet protocol (VoIP), as well other time-sensitive traffic flows, with mobile terminals. These wireless access networks need to quickly determine the current location of a mobile terminal to meet the requirements of the traffic flow. During active mode, the locations of mobile terminals are updated and maintained by a home agent in the network. However when mobile terminals are in idle mode, their locations are not continually updated. For some time-sensitive applications, the delay associated with locating a mobile terminal in idle mode may be excessive.

Thus, there are general needs for wireless access networks and methods for handover that allow a mobile station in idle mode to be located easier. There are also general needs for wireless access networks that can page a mobile terminal for time-sensitive applications, such as VoIP and push-to-talk (PTT) applications, without excessive delay when the mobile terminal is in idle mode.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
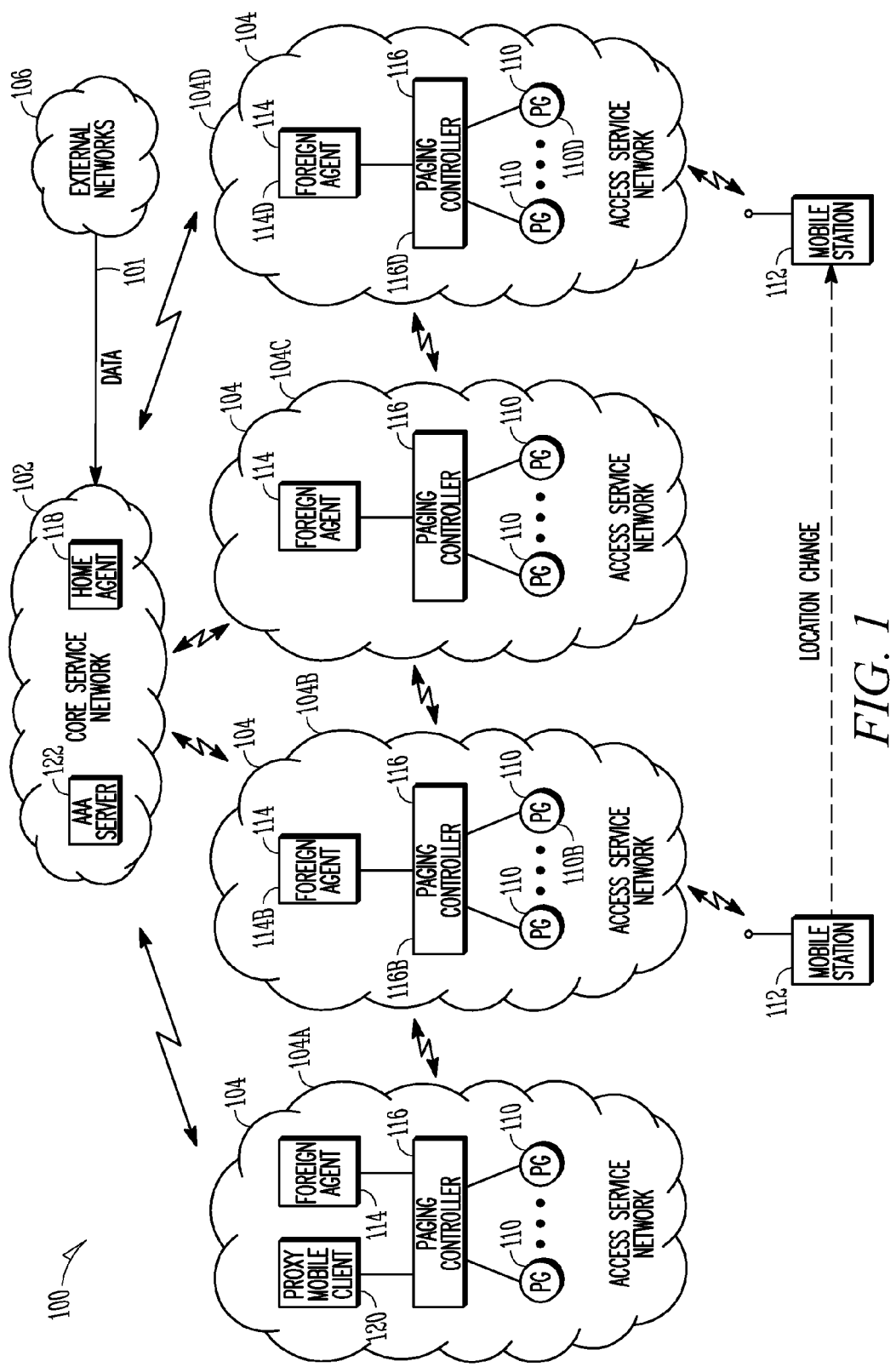
FIG. 1 illustrates a wireless communication network in accordance with some embodiments of the present invention.

FIG. 1 illustrates a wireless communication network in accordance with some embodiments of the present invention. Wireless communication network 100 may include core service network 102 and a plurality of access service networks 104, shown as access service network 104A, access service network 104B, access service network 104C and access service network 104D. Access service networks 104 route communications between core service network 102 and mobile stations, such as mobile station 112, allowing mobile stations, such as mobile station 112, to receive communications from external networks 106 and to send communications to external networks 106.

Each access service network 104 may include foreign agent 114 and paging controller 116 for communicating with other access service networks and/or communicating with core service network 102. Access service networks 104 may also include base stations for communicating radio-frequency signals with the mobile stations, such as mobile station 112. Each of the base stations may be associated with one of paging groups (PGs) 110. Paging groups 110 may comprise a cluster of base stations and may be administered by an associated one of paging controllers 116.

In some embodiments, some access service networks 104, such as access service network 104A, may include proxy mobile client 120. Proxy mobile client 120 may serve as a proxy for mobile station 112 and may perform certain network operations on behalf of mobile station 112. These embodiments are discussed in more detail below. Although proxy mobile client 120 is illustrated in access service network 104A, any of access service networks 104 may include one or more proxy mobile clients for mobile stations serviced by access service networks 104.

In some embodiments, access service networks 104 may include an access service network gateway (not separately illustrated) for communicating with core service network 102. Each access service network gateway may include a foreign agent, such as one of foreign agents 114, a paging controller, such as one of paging controllers 116 and/or a proxy mobile client, such as proxy mobile client 120. In some embodiments, one or more of the functional elements of an access service network gateway may be distributed among the various physical entities, although the scope of the invention is not limited in this respect.

Core service network 102 may include home agent 118 and authentication, accounting, and administration (AAA) server 122. Home agent 118 may store an internet protocol (IP) address of foreign agent 114 of access service network 104 where mobile station 112 is currently located. In this way, data 101 destined for mobile station 112 that is received at core service network 102 may be routed to the proper one of access service networks 104 based on the information in home agent 118.

In accordance with some embodiments, mobile station 112 may operate in either active mode or idle mode. During active mode, mobile station 112 may be actively communicating within one of access service networks 104. During idle mode, mobile station 112 may be in a lower-power state and may be listening for pages and/or broadcast channels within one of access service networks 104. During active mode, the IP address of mobile station 112 with respect to each of access service networks 104 may be updated and maintained by home agent 118. In active mode, the location of mobile station 112 with respect to a particular base station within one of paging groups 110 may also be known because mobile station 112 may be actively engaging in communications through the base station. However in conventional networks, the location of mobile station 112 with respect to access service networks 104 may not be known when mobile station 112 is in idle mode because mobile station 112 may not be actively engaging in communications. When mobile station 112 changes access service networks 104, the IP address of mobile station 112 may need to be changed or updated.

During idle mode, mobile station 112 may receive an incoming message, such as a page, to indicate to mobile station 112 that there is data for mobile station 112 or that there is an incoming call for mobile station 112. In response to the page, mobile station 112 may transition from idle mode to active mode to receive and to process the data. The use of an updated IP address for mobile station 112 while in idle mode may allow paging and connection establishment latency to be reduced, although the scope of the invention is not limited in this respect. This may help support the requirements for time-sensitive applications such as VoIP and PTT.

In accordance with some embodiments, mobile station 112 may not necessarily have the capability to perform certain network operations, such as mobile internet protocol (MIP) registration request and MIP registration response operations, for updating its IP address as it changes between paging groups 110 of different access service networks 104. In these embodiments, proxy mobile client 120 may serve as a proxy for mobile station 112 and may perform certain network operations, such as MIP registration request and MIP registration response operations, on behalf of mobile station 112. In these embodiments, the infrastructure of network 100 may be proxy mobile IP (PMIP) based and proxy mobile client 120 may be a PMIP client for mobile station 112, although the scope of the invention is not limited in this respect.

In some embodiments, the infrastructure of network 100 may also support client mobile IP (CMIP) operations, although the scope of the invention is not limited in this respect. In these embodiments that support CMIP operations, some mobile stations may have capability to perform MIP registration request and MIP registration response operations, although the scope of the invention is not limited in this respect.

In accordance with some embodiments, a handover for mobile station 112 may occur when mobile station 112 reaches a new paging group 110 while mobile station 112 is in idle mode. In the examples discussed herein, an anchor paging controller, illustrated as anchor paging controller 116B, may refer to the paging controller 116 of the access service network 104 where mobile station 112 was last registered, and a relay paging controller, illustrated as relay paging controller 116D, may refer to a paging controller 116 of an access service network 104 where mobile station 112 may have relocated. In these embodiments, a location update message may be sent to relay paging controller 116D within access service network 104D where mobile station 112 now resides. In these embodiments, the location update message may include the network address of anchor paging controller 116B. Relay paging controller 116D may contact anchor paging controller 116B to inform anchor paging controller 116D that mobile station 112 has changed locations while in idle mode. In these embodiments, anchor paging controller 116B may maintain the latest location information for mobile station 112 (e.g., in terms of one of paging groups 110) while mobile station 112 is in idle mode.

When anchor paging controller 116B receives a location update request message from relay paging controller 116D, it may compare the address of relay paging controller 116D it received in the message with the address of the last paging controller 116 that it had stored in its location register for mobile station 112. If the two addresses match, then mobile station 112 has switched paging groups 110 within the same access service network 104. In this situation, no action is needed to update the location information for mobile station 112. In this situation anchor paging controller 116B and relay paging controller 116D may be the same paging controller within the same access service network.

When the addresses are different, then anchor paging controller 116B determines that mobile station 112 has switched to a new paging group, such as paging group 110D in access service network 104D. In this situation, a handover procedure may be performed without the knowledge of the mobile station 112, to update its foreign to foreign agent 114 of the access service network 104D where mobile station 112 is now located. An example of a handover procedure for a mobile station operating in idle mode is described below.

In accordance with some embodiments, paging and data path establishment for mobile station 112 may occur quicker when mobile station 112 exits idle mode. As a result, the overall paging and network re-entry latency may be reduced. Furthermore, the network resources used to perform data path setup when mobile station 112 is to exit idle mode may be reduced and a shorter data path may be maintained between mobile station 112 and home agent 118 during idle mode.

Figure 2:
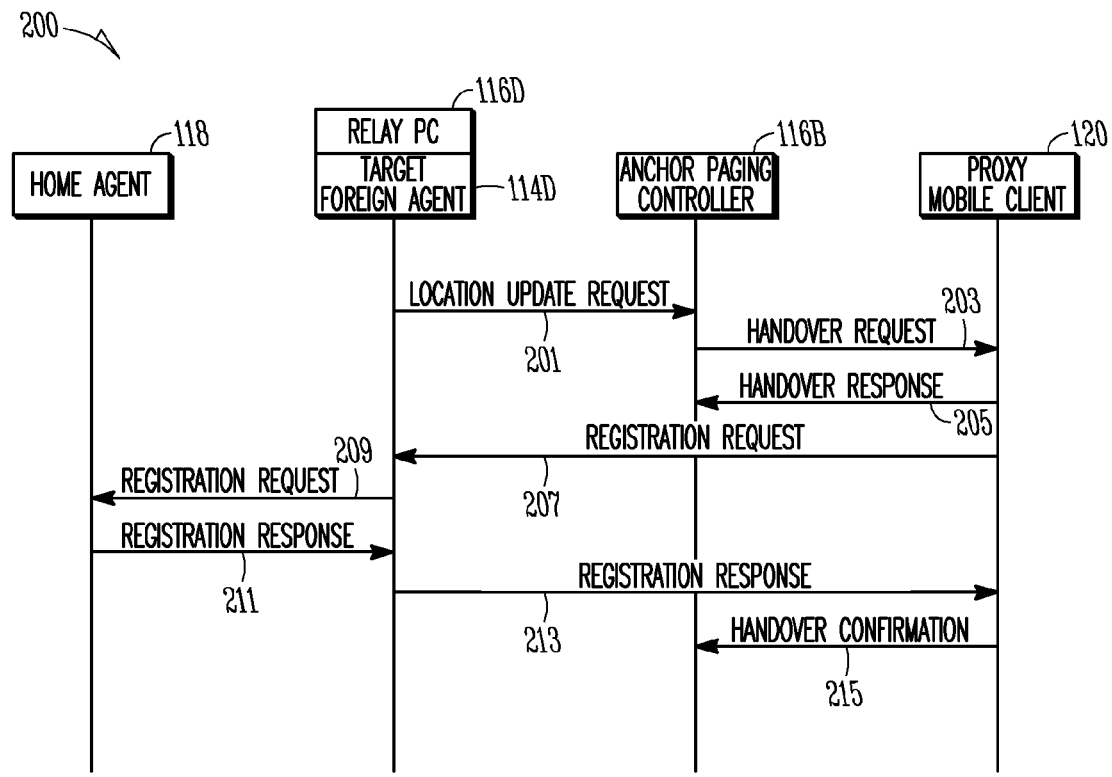
FIG. 2 illustrates an idle mode handover procedure in accordance with some embodiments of the present invention.

FIG. 2 illustrates an idle mode handover procedure in accordance with some embodiments of the present invention. Idle mode handover procedure 200 may be performed to maintain a current IP address of a mobile station, such as mobile station 112 (FIG. 1), that is in idle mode as the mobile station changes its location between paging groups 110 (FIG. 1) of different access service network 104 (FIG. 1). In FIG. 2, home agent 118 may correspond to home agent 118 (FIG. 1), relay paging controller (PC) 116D may correspond to relay paging controller 116D (FIG. 1), target foreign agent 114 may correspond to foreign agent 114 (FIG. 1), anchor paging controller 116B may correspond to anchor paging controller 116B (FIG. 1) and proxy mobile client 120 may correspond to proxy mobile client 120 (FIG. 1).

Referring to FIGS. 1 and 2, after mobile station 112 changes location between paging groups 110, location update request message 201 may be received from relay paging controller 116D at anchor paging controller 116B. Anchor paging controller 116B may determine whether mobile station 112 has switched access service networks 104 based on a network address of relay paging controller 116D. When mobile station 112 has switched between access service networks 104, handover request message 203 may be sent to proxy mobile client 120 of mobile station 112 to indicate a network address of target foreign agent 114 for use when routing subsequent communications to mobile station 112.

In some embodiments, the network address of relay paging controller 116D may be received by anchor paging controller 116B in location update request message 201. In some embodiments, location update request message 201 may be sent from relay paging controller 116D when mobile station 112 has changed its location from prior paging group 110B to new paging group 110D, although the scope of the invention is not limited in this respect.

In some embodiments, anchor paging controller 116B may determine whether mobile station 112 has either switched paging groups 110 within current access service network 104B or switched paging groups 110 to a new access service network, such as access service network 104C or access service network 104D, by comparing the network address of the relay paging controller received in location update request message 201 with a network address of a paging controller stored in a location register of anchor paging controller 116B, although the scope of the invention is not limited in this respect.

In some embodiments, handover request message 203 may be sent if the network address of relay paging controller 116D received in location update request message 201 is different from the network address of the paging controller stored in the location register of anchor paging controller 116B. In some embodiments, handover request message 203 may be sent from anchor paging controller 116B to proxy mobile client 120 of mobile station 112. In some embodiments, handover request message 203 may include a network address of target foreign agent 114. In some embodiments, target foreign agent 114 and relay paging controller 116D may be associated with access service network 104D, although the scope of the invention is not limited in this respect.

In some embodiments, anchor paging controller 116B may refrain from sending handover request message 203 to proxy mobile client 120 if the network address of relay paging controller 116D received in location update request message 201 matches the network address of the paging controller stored in the location register of anchor paging controller 116B. In these embodiments, the matching addresses may indicate that mobile station 112 has changed paging groups 110 of paging controller 116B of current access service network 104B, although the scope of the invention is not limited in this respect.

In some embodiments, proxy mobile client 120 may send handover response message 205 in response to handover request message 203. In these embodiments, handover response message 205 may indicate that the handover request message 203 was successfully received, although the scope of the invention is not limited in this respect. In some embodiments, proxy mobile client 120 may send registration request message 207 in response to receipt of handover request message 203 to target foreign agent 114. Registration request message 207 may instruct target foreign agent 114 to register the mobile station 112 as being associated with home agent 118 and anchor paging controller 116B, although the scope of the invention is not limited in this respect.

In some embodiments, in response to receiving registration request message 207 from proxy mobile client 120, target foreign agent 114 may send registration request message 209 to home agent 118. In these embodiments, registration request message 209 may include an IP address of target foreign agent 114. Home agent 118 may store the IP address of target foreign agent 114 for mobile station 112 for use in routing the subsequent communications to mobile station 112, although the scope of the invention is not limited in this respect.

In some embodiments, home agent 118 may send registration response message 211 to target foreign agent 114 in response to receipt of the registration request message 209. Target foreign agent 114 may send registration response message 213 to proxy mobile client 120 to indicate that home agent 118 has been updated with the IP address of target foreign agent 114, although the scope of the invention is not limited in this respect.

In some embodiments, proxy mobile client 120 may send handover confirmation message 215 to anchor paging controller 116B to indicate that handover of mobile station 112 in idle mode has been successfully completed and that a prior foreign agent, such as foreign agent 114B, is no longer a current foreign agent for mobile station 112, although the scope of the invention is not limited in this respect.

In some embodiments, the network address of relay paging controller 116D may be in either in a header (e.g., the source IP address) or a body of location update request message 201, although the scope of the invention is not limited in this respect.

In some embodiments, mobile station 112 may be a mobile IP terminal associated with proxy mobile client 120 and proxy mobile client 120 may send mobile internet-protocol (MIP) registration request (RRQ) and MIP registration response (RRP) messages on behalf of mobile station 112 (i.e., for re-anchoring) when mobile station 112 changes paging groups 110. In these embodiments, proxy mobile client 120 may perform at least some network operations (e.g., sending the MIP RRP and RRQ messages) on behalf of mobile station 112, although the scope of the invention is not limited in this respect.

The use of proxy mobile client 120 does not involve a change in the point of attachment address when a mobile station moves allowing mobile station 112 to operate without an MIP stack. In these embodiments, mobile station 112 may be a mobile internet protocol IP terminal without capability to send the MIP RRP and RRQ messages when it changes location. In these embodiments, mobile station 112 may rely on proxy mobile client 120 to perform these network operations, although the scope of the invention is not limited in this respect.

In some embodiments, when mobile station 112 changes locations between paging groups 110 when in idle mode, mobile station 112 may send a ranging request (RNG-REQ) message to relay paging gateway 116B through a base station of the new paging group 110. Mobile station 112 may identify the new paging group 110 based on a paging group identifier (PG-ID) that may be broadcasted by the base stations of the new paging group 110. In response to the ranging request message, relay paging gateway 116D may send location update request message 201 to anchor paging controller 116B as previously discussed. After registration response message 213 is sent to proxy mobile client 120, a ranging response (RNG-RESP) message may be sent to mobile station 112, although the scope of the invention is not limited in this respect. The ranging response message may indicate that the location update was successfully registered at the location register of paging controller 116D.

In active mode, on the other hand, mobile station 112 ranging request messages are not sent by mobile station 112 when it crosses a paging group boundary because mobile station 112 may be tracked at the base-station level of granularity.

In some embodiments, proxy mobile client 120 for mobile station 112 may be located within first access service network 104A, and anchor paging controller 116B may be located within a second access service network 104B. Relay paging controllers, such as relay paging controller 110C or relay paging controller 116D, may be located within either third or fourth access service network 104C or 104D respectively. In these embodiments, second access service network 104B may be a prior access service network, and either a third access service network 104C or fourth access service network 104D may be a new access service network for mobile station 112, although the scope of the invention is not limited in this respect.

In some embodiments, at least some of access service networks 104 may comprise broadband wireless access (BWA) networks, such as WiMax networks, that communicate with a plurality of mobile stations using a multiple-access technique, such as orthogonal frequency division multiple access (OFDMA). In some embodiments, mobile station 112 may be a broadband wireless access network mobile terminal, although the scope of the invention is not limited in this respect.

In some embodiments, data 101 destined for the mobile station 112 may be received at core service network 102 and may be routed to one of the access service networks 104 based on the IP address stored in home agent 118 for mobile station 112. In some embodiments, at least some of data 101 may comprise voice-over IP data. In some embodiments, mobile station 112 may be operable in a push-to-talk mode, although the scope of the invention is not limited in this respect. In some embodiments, data 101 may comprise a paging or datapath establishment message directed to mobile station 112, although the scope of the invention is not limited in this respect.

Figure 3:
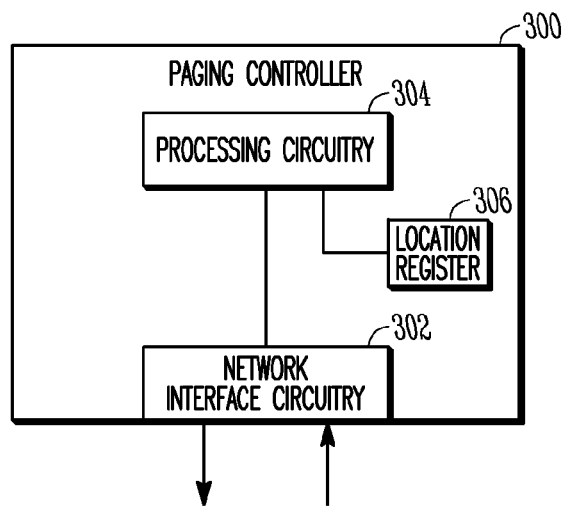
FIG. 3 illustrates a block diagram of a paging controller in accordance with some embodiments of the present invention.

FIG. 3 illustrates a block diagram of a paging controller in accordance with some embodiments of the present invention. Paging controller 300 may be suitable for use as any one of paging controllers 116 (FIG. 1). In some embodiments, paging controller 300 may be suitable for anchor paging controller 116B (FIG. 1), although the scope of the invention is not limited in this respect. Paging controller 300 may include network interface circuitry 302, processing circuitry 304 and location register 306. Paging controller 300 may also include other functional elements not illustrated.

In accordance with some embodiments, network interface circuitry 302 may receive a location update request message, such as location update request message 201 (FIG. 2) from a relay paging controller, such as relay paging controller 116D (FIG. 1) when a mobile station, such as mobile station 112 (FIG. 1) has changed paging groups 110 (FIG. 1). Location register 306 may store a network address of paging controller 300. Processing circuitry 304 may determine whether mobile station 112 (FIG. 1) has switched access service networks 104 (FIG. 1) by comparing a network address of a relay paging controller received in location update request message 201 (FIG. 2) with a network address of paging controller 300 stored in location register 306.

In some embodiments, when processing circuitry 304 determines that mobile station 112 (FIG. 1) has switched between access service networks 104 (FIG. 1), network interface circuitry 302 may send handover request message 203 (FIG. 2) to proxy mobile client 120 (FIG. 1) to indicate the address of the target foreign agent, such as foreign agent 114 (FIG. 1), for use when routing subsequent communications to mobile station 112 (FIG. 1). In these embodiments, paging controller 300 may be operating as anchor paging controller 116B.

In some embodiments, the handover request message 203 may be sent by network interface circuitry 302 if the network address of the relay paging controller received in location update request message 201 is different from the network address of the anchor paging controller stored in location register 306. In some embodiments, network interface circuitry 302 may refrain from sending handover request message 203 (FIG. 2) to proxy mobile client 120 if the network address of the relay paging controller received in location update request message 201 (FIG. 2) matches the network address of the anchor paging controller stored in location register 306.

Although paging controller 300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of paging controller 300 may refer to one or more processes operating on one or more processing elements.

In some embodiments, mobile station 112 (FIG. 1) may communicate orthogonal frequency division multiplexed (OFDM) communication signals over a multicarrier communication channel. The multicarrier communication channel may be within a predetermined frequency spectrum and may comprise a plurality of orthogonal subcarriers. In some embodiments, the multicarrier signals may be defined by closely spaced OFDM subcarriers. In some of these embodiments, mobile station 112 (FIG. 1) may communicate in accordance with a multiple access technique, such as orthogonal frequency division multiple access (OFDMA), although the scope of the invention is not limited in this respect. In some embodiments, mobile station 112 may be part of a wireless communication device that may communicate using spread-spectrum signals, although the scope of the invention is not limited in this respect.

In some embodiments, mobile station 112 (FIG. 1) may be a broadband wireless access (BWA) network communication station, such as a Worldwide Interoperability for Microwave Access (WiMax) communication station, although the scope of the invention is not limited in this respect. In some embodiments, mobile station 112 (FIG. 1) may be a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly. In some BWA network embodiments, the frequency spectrum for the signals communicated by mobile station 112 (FIG. 1) may comprise frequencies between 2 and 11 gigahertz (GHz), although the scope of the invention is not limited in this respect.

In some embodiments, mobile station 112 (FIG. 1) may communicate in accordance with specific communication standards, such as the Institute of Electrical and Electronics Engineers (IEEE) standards including the IEEE 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.16 standards, please refer to "IEEE Standards for Information Technology—Telecommunications and Information Exchange between Systems" Metropolitan Area Networks—Specific Requirements—Part 16: "Air Interface for Fixed Broadband Wireless Access Systems," May 2005 and related amendments/versions.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or nonvolatile memory or a combination thereof.

Some embodiments of the invention may be implemented in one or a combination of hardware, firmware and software. Some embodiments of the invention may also be implemented as instructions stored on a computer-readable storage medium, which may be read and executed by at least one processor to perform the operations described herein. A computer-readable storage medium may include any tangible mechanism for storing or transmitting information in a form readable by a machine (e.g., a computer). For example, a machine-readable medium may include read-only memory (ROM), random-access memory (RAM), magnetic disk storage media, optical storage media, flash-memory devices, and other tangible mediums.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus, the following claims are hereby incorporated into the detailed description, with each claim standing on its own as a separate preferred embodiment.

What is claimed is:

1. A method performed by an anchor paging controller for maintaining a current network address for a mobile station in idle mode as the mobile station changes paging groups of different proxy mobile internet protocol (PMIP) enabled access service networks (ASNs) while in idle mode, the method comprising:
   comparing a network address of a relay paging controller received in a location update request message with a network address stored in a location register of the anchor paging controller of a current ASN to determine whether the mobile station has switched between paging groups of different ASNs while in idle mode; and
   when the mobile station has switched between paging groups of different ASNs while in idle mode, sending by the anchor paging controller while the mobile station is in idle mode, a handover request message from the anchor paging controller to a proxy mobile client of the mobile station to provide a network address of a foreign agent of a target ASN.

2. The method of claim 1 wherein the proxy mobile client operates in any one of the ASNs to serve as a proxy for the mobile station at least while the mobile station is in idle mode.

3. The method of claim 2 wherein the mobile station has switched paging groups within the current ASN when the network addresses match, and
   wherein the mobile station has switched between paging groups of different ASNs when the network addresses do not match.

4. The method of claim 3 further comprising:
   performing a location update procedure wherein the anchor paging controller updates a location register with idle mode information of the mobile station; and
   performs a handover procedure to allow the idle mode mobile station to operate in the target ASN.

5. The method of claim 1 wherein the mobile station operates within the PMIP enabled ASNs in accordance with one of the IEEE 802.16 standards.

6. A system comprising proxy mobile internet protocol (PMIP) enabled access service network (ASNs) including an anchor paging controller and configured to maintain a current network address for a mobile station in idle mode, the system comprising:
   processing circuitry to compare a network address of a relay paging controller received in the location update request message with a network address stored in a location register of the anchor paging controller of a current ASN to determine whether the mobile station has switched between paging groups of different ASNs while in idle mode; and
   transmitter circuitry to send a handover request message from the anchor paging controller to a proxy mobile client of the mobile station to provide a network address of a foreign agent of a target ASN when the mobile station has switched between paging groups of different ASNs while in idle mode.

7. The system of claim 6 wherein the proxy mobile client operates in any one of the ASNs to serve as a proxy for the mobile station at least while the mobile station is in idle mode.

8. The system of claim 7 wherein the mobile station has switched paging groups within the current ASN when the network addresses match, and
   wherein the mobile station has switched between paging groups of different ASNs when the network addresses do not match.

9. The system of claim 8 wherein the processing circuitry:
   performing a location update procedure wherein the anchor paging controller updates a location register with idle mode information of the mobile station; and
   performs a handover procedure to allow the idle mode mobile station to operate in the target ASN.

10. The system of claim 6 wherein the mobile station operates within the PMIP enabled ASNs in accordance with one of the IEEE 802.16 standards.

11. A method for relocating a foreign agent (FA) for an idle mode mobile station (MS) in a proxy mobile internet protocol (PMIP) enabled access service network (ASN), the relocation of the FA being triggered by either an anchor paging controller or a paging controller of a target ASN when the idle mode mobile stations moves between paging groups of different ASNs while in idle mode, the method comprising:
   performing a location update procedure wherein the anchor paging controller updates a location register with idle mode information of the mobile station;
   sending, by the anchor paging controller while the mobile station is in idle mode, an anchor handover request from the anchor paging controller to initiate FA relocation when the mobile station has switched between paging groups of different ASNs; and
   performing a handover procedure, while the mobile station is in idle mode, to allow the target ASN to operate as the current ASN using the relocated FA.

12. The method of claim 11 wherein performing the location update procedure further comprises comparing a network address received in a location update request message with a network address stored in a location register of the anchor paging controller of a current ASN to determine whether the mobile station has switched between paging groups of different ASNs.

13. The method of claim 11 wherein the mobile station operates within the PMIP enabled ASNs in accordance with one of the IEEE 802.16 standards.

* * * * *